United States Patent
Restiau et al.

(10) Patent No.: US 10,243,768 B2
(45) Date of Patent: *Mar. 26, 2019

(54) CONFIGURATION OF A NEAR-FIELD COMMUNICATION ROUTER ACCORDING TO THE MODULATION TYPE

(71) Applicant: Proton World International N.V., Zaventem (BE)

(72) Inventors: Guy Restiau, Ramillies (BE); Youssef Ahssini, Vilvoorde (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 279 days.

This patent is subject to a terminal disclaimer.

(21) Appl. No.: 14/951,283

(22) Filed: Nov. 24, 2015

(65) Prior Publication Data

US 2016/0080184 A1    Mar. 17, 2016

Related U.S. Application Data

(63) Continuation of application No. 13/615,350, filed on Sep. 13, 2012, now Pat. No. 9,235,738.

(30) Foreign Application Priority Data

Sep. 30, 2011 (FR) .................................. 11 58815

(51) Int. Cl.
*H04L 12/26* (2006.01)
*H04L 27/06* (2006.01)
(Continued)

(52) U.S. Cl.
CPC .......... *H04L 27/06* (2013.01); *G06K 7/10138* (2013.01); *G06K 7/10237* (2013.01);
(Continued)

(58) Field of Classification Search
CPC ............ G06K 19/0723; G06K 7/0008; G06K 7/10237; G06K 7/10297; H04B 5/02;
(Continued)

(56) References Cited

U.S. PATENT DOCUMENTS

| 6,213,402 B1 | 4/2001 | Reiner |
| 8,537,907 B2 | 9/2013 | Sung |

(Continued)

FOREIGN PATENT DOCUMENTS

| CN | 101848015 A | 9/2010 |
| EP | 2 226 950 A2 | 9/2010 |
| EP | 2 234 356 A2 | 9/2010 |

OTHER PUBLICATIONS

French Search Report and Written Opinion, dated Jul. 25, 2011, from corresponding French Application No. 11/588815.
(Continued)

*Primary Examiner* — Harun Chowdhury
(74) *Attorney, Agent, or Firm* — Seed IP Law Group LLP

(57) ABSTRACT

A first near-field communication device is configured according to a modulation type transmitted by a second device. A decoder of the first device decodes a received signal using type-A modulation during a first time slot corresponding to the duration of a first type-A symbol. The first device determines the modulation type transmitted by the second device according to the value of the decoded symbol.

23 Claims, 3 Drawing Sheets

(51) Int. Cl.
*G06K 7/10* (2006.01)
*H04B 5/02* (2006.01)
*H04L 27/00* (2006.01)
*H04B 5/00* (2006.01)

(52) U.S. Cl.
CPC ....... *G06K 7/10297* (2013.01); *H04B 5/0068* (2013.01); *H04B 5/02* (2013.01); *H04L 27/0002* (2013.01); *H04L 27/0008* (2013.01); *H04L 27/0012* (2013.01)

(58) Field of Classification Search
CPC . H04L 25/0262; H04L 25/49; H04L 27/0008; H04L 27/06; H04L 27/0002; H04L 27/0012
USPC ....... 370/252, 328, 329, 389; 455/41.1, 41.2
See application file for complete search history.

(56) References Cited

U.S. PATENT DOCUMENTS

| | | |
|---|---|---|
| 9,143,201 B2 | 9/2015 | Sung |
| 2007/0075143 A1* | 4/2007 | Higashi .............. G06K 19/0723 235/451 |
| 2008/0091677 A1 | 4/2008 | Pedersen et al. |
| 2009/0322484 A1 | 12/2009 | Toriyama et al. |
| 2010/0124258 A1 | 5/2010 | Sekiguchi et al. |
| 2010/0191870 A1 | 7/2010 | Qi et al. |
| 2010/0226461 A1* | 9/2010 | Tomizawa ................ H04B 5/02 375/340 |
| 2010/0248624 A1* | 9/2010 | Miyakawa .......... H04L 25/0262 455/41.1 |
| 2011/0142040 A1* | 6/2011 | Funamoto ............ G06K 7/0008 370/389 |
| 2011/0183635 A1 | 7/2011 | Kim |
| 2012/0028574 A1 | 2/2012 | Bangs et al. |
| 2013/0083787 A1 | 4/2013 | Restiau et al. |
| 2013/0100825 A1 | 4/2013 | Bancel et al. |

OTHER PUBLICATIONS

International Search Report and Written Opinion dated Nov. 6, 2012, from corresponding International Application No. PCT/EP2012/068646, 11 pages.

* cited by examiner

CONFIGURATION OF A NEAR-FIELD COMMUNICATION ROUTER ACCORDING TO THE MODULATION TYPE

BACKGROUND

Technical Field

Embodiments generally relate to electronic circuits and, more specifically, to near-field radio frequency communication devices.

Discussion of the Related Art

More and more radio frequency communication devices are capable of operating in near field with a fixed terminal or another mobile device. In particular, most mobile phone type telecommunication devices are now equipped with a near-field communication (NFC) router.

It is generally spoken of NFC devices operating in card mode (or emulating a card), as opposed to a second operating mode of such devices, which is to emulate a card reader to cooperate with another near-field device. The device then behaves as a terminal.

There are different near-field communication standards. The difference between such standards essentially is the modulation and coding type of data to be transmitted. Formerly, transponders were most often dedicated to one type of modulation. They are now designed to be able to operate according to different modulation types are can thus be configured to set this type on each new transaction with a terminal.

The modulation type is most often set by the terminal and the transponder-type device modifies the configuration of its NFC router to be able to communicate with this reader.

Usually, the router or the radio frequency front head capable of operating according to different modulations successively switches to these different modulations until it recognizes a request transmitted by a reader. This however takes time.

Further, some terminals are themselves capable of operating according to different modulation types to be able to adapt to transponders dedicated to a single type. In this case, the terminal successively sends requests according to the different types until it receives a response in one of the types. However, the terminal should leave enough time between two types (generally on the order of a few milliseconds) so that a configurable transponder also has time to scan the different modulation types until both configurations (terminal and transponder) match.

Such a configuration process is long and makes the device in card mode risk never to detect a request.

BRIEF SUMMARY

An embodiment facilitates addressing all or part of the disadvantages of usual card-mode near-field telecommunication devices.

An embodiment provides a process for configuring a device in card mode.

An embodiment provides a method for configuring a first near-field communication device according to a modulation type transmitted by a second device, wherein:
 a decoder of the first device is configured to decode a type-A modulation;
 a signal received during a first time slot corresponding to the duration of a first type-A symbol is decoded; and
 the first device is configured according to the value of the decoded symbol to determine the modulation type.

According to an embodiment, said duration corresponds to the duration of a bit in type-A modulation.

According to an embodiment, said symbol is divided in four and decoded by assigning a state 0 or 1 to each quarter.

According to an embodiment, if the first symbol is 0111, the decoder is configured for type A for the rest of the transmission.

According to an embodiment, if the first symbol is 0000, a second time slot of same duration as the first one and consecutive thereto is decoded for type A.

According to an embodiment:
 if a second symbol corresponding to the second time slot is also 0000, the decoder is configured for the type-B modulation; and
 otherwise, the decoder is configured for the type-15693 modulation.

According to an embodiment, if the first symbol is neither 0111 nor 0000, the decoder is configured for the type-C modulation.

According to an embodiment, if the first symbol is 0101, the decoder is configured for the type-C modulation at 212 kbits per second.

According to an embodiment, if the first symbol is further different from 0101, the decoder is configured for the type-C modulation at 424 kbits per second.

Another embodiment provides a near-field receive device comprising the above circuit.

The foregoing and other features and potential advantages will be discussed in detail in the following non-limiting description of specific embodiments in connection with the accompanying drawings.

DETAILED DESCRIPTION

Figure 1:
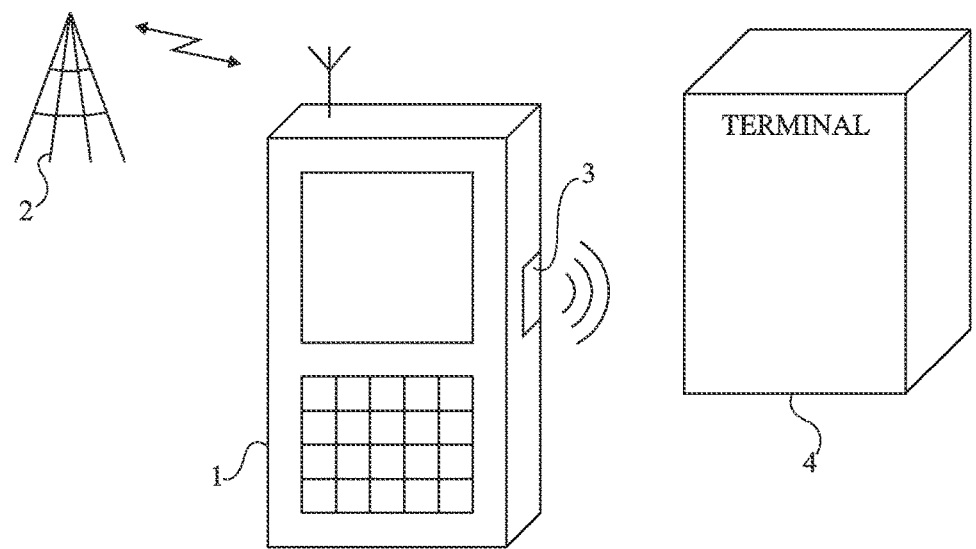
FIG. 1 is a simplified diagram of a system of the type to which the embodiments which will be described apply.

The same elements have been designated with the same reference numerals in the different drawings, where the timing diagrams have been drawn out of scale. For clarity, only those steps and elements which are useful to the understanding of the described embodiments have been shown and will be detailed. In particular, the circuits for generating communication frames according to the different standards have not been detailed, the described embodiments being compatible with usual standards. Further, the generation of polling requests by a read or read/write terminal has not been detailed either, the described embodiments being here again compatible with usual terminals.

The embodiments which will be described aim at an NFC router operating in card mode and at its configuring for a communication with a reader.

FIG. 1 is a simplified representation of an example of a communication system of the type to which the embodiments which will be described apply.

A mobile telecommunication device 1 (for example, a GSM-type mobile device) is capable of communicating with a network symbolized by an antenna 2. Device 1 is further equipped with a near-field communication router 3 capable of communicating with a terminal 4 (TERMINAL) for generating a radio frequency field.

Most often, a device 1 equipped with an NFC router is capable of operating both in so-called reader mode and in so-called card mode. In reader mode, device 1 and its NFC router 3 behave as a read and write terminal of another near-field communication device. In card mode, the mobile device operates as a contactless electromagnetic transponder or chip card to communicate with terminal 4. There exist many alternative telecommunication devices equipped with an NFC router, but all use the same principle: when operating in card mode and within the range of a near-field communication terminal, they wait for a request from this terminal to respond thereto.

The embodiments which will be described hereinafter more specifically refer to devices integrating both near-field communication (NFC) and telecommunication circuitry. The described solutions however apply to any near-field communication device capable of operating according to several modulation types or standards.

When such a device is within the range of a terminal, it successively switches to the different modulation types with which it is capable of operating, to detect the type according to which the terminal sends its request and to be able to start a near-field communication therewith.

In certain cases, the terminal itself is capable of operating according to different types. In this case, it starts by sending a request according to a first communication or modulation type and then, in the absence of any response from a transponder, switches to another type, and so on. On the terminal side, this operation carries on in a loop as long as no response has been received from a transponder.

Such usual solutions take time before the communication can start. Further, the modulation type risks not being detected.

This problem becomes more of a concern with the development of NFC routers capable of operating according to different modulation types and the multiplicity of multistandard terminals.

The embodiments which will be described may take advantage of the specificities of the most frequent near-field communication standards to shorten the time of detection of the modulation type and reduce situations where no type is detected.

Any transmission from a near-field communication terminal to a transponder (reference will be made hereinafter to a card) is performed in amplitude modulation. The difference between modulation types is due to the coding of the amplitude modulation transmission to transmit the bits.

Figure 2:
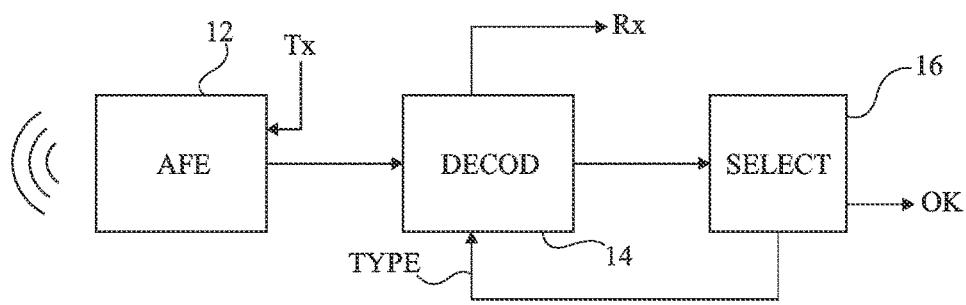
FIG. 2 is a block diagram of an embodiment of an NFC router configuration system.

FIG. 2 is a simplified block diagram of an embodiment of a modulation type selection device. The representation of FIG. 2 is simplified and functional.

The NFC router is assumed to comprise an analog front end 12 (AFE) equipped with means for receiving the radio frequency signals. In the example of FIG. 2, analog front end 12 is further assumed to be equipped with circuitry (symbolized by a signal Tx) enabling to transmit to the terminal. It is generally spoken of a retromodulation from the transponder to the terminal. An output of front end 12 is sent to a demodulator/decoder 14 (DECOD) of the received signals.

It for example is an amplitude demodulation circuit associated with a digital decoder. Decoder 14 provides the received signals (Rx) to the other mobile telecommunication device circuits (not shown). According to the embodiment shown in FIG. 2, circuit 14 also delivers the demodulated signal to a block 16 (SELECT) for selecting the received modulation type (TYPE).

The function of decoder 14 is, from a modulation type with which it is initially configured, to detect the real type of modulation of the signal received from front end 12, to configure decoder 14 for the rest of the transmission once the type has been selected by block 16.

As will be explained hereinafter in relation with FIG. 4, it is provided to use a decoding based on a so-called overcoded type-A modulation to detect the different modulation types that may be received.

In NFC routers, radio frequency communications are based on standards respecting a carrier frequency of approximately 13.56 MHz. Transmissions from the terminal to the transponder are amplitude-modulated, mainly according to four families of types, called type A, type B, type C, and type 15693 (ISO standards 14443). The different types have different transmission speeds, carrier modulation indexes, and data codings.

The transmission speed of types A and B is 106 kbits/s, 212 kbits/s, 424 kbits/s, or 848 kbits/s. The transmission speed of type C is 212 kbits/s or 424 kbits/s. The rate of type 15693 is 6.64 kbits per second or 26.48 kbits/s.

The modulation index of type A is 100%. The modulation index of type B is 10%. Type C has a modulation index ranging between 8 and 30%. Type 15693 has a modulation index of 100% (type noted 15693-100) or 10% (type 15693-10). Type 15693 at 6.64 kbits/s bears reference 256 (15693-100-256 and 15693-10-256) and type 15693 at 26.48 kbits/s bears reference 4 (15693-100-4 and 15693-10-4).

Figure 3:
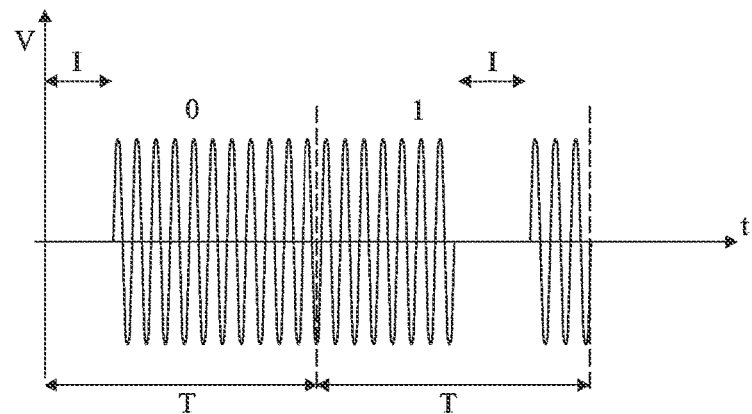
FIG. 3 is a simplified timing diagram illustrating an example of modulated signals received by an NFC router.

FIG. 3 illustrates, in a simplified timing diagram, a usual example of amplitude modulation transmission of bits at states 0 and 1 with a type-A modulation. These timing diagrams show examples of the shape of voltage V recovered by front end 12. These signals are carried by a carrier at 13.56 MHz and are amplitude-modulated.

In the case of a terminal-to-transponder transmission considered herein to detect the modulation type transmitted by the terminal on the transponder side, the data bits are, in type A, coded according to the position of a modulation-free interval I (or at a level lower than the high no-load level for other types such as type B) during a determined period T representing a symbol. This modulation type is an ASK-type modulation (amplitude shift keying). A bit 0 is decoded if pulse I is at the beginning of a period T and a bit 1 is decoded if pulse I is not at the beginning of period T. The duration of period T, and thus of a symbol, is approximately 9.44 microseconds. The duration of pulse I corresponds to the duration of the symbol divided by 4.

The amplitude modulation is performed by lowering a high level since near-field communication systems basically are designed for transponders extracting the power supply of the circuits that they comprise from the high-frequency field emitted by the terminal.

The embodiments which will be described may take advantage of the fact that, whatever the modulation type, a transmission from the terminal to the transponder starts by an initial phase according to a specific coding, but with symbols all having a duration of approximately 9.44 microseconds (corresponding to a 106 kbits/s rate) independently from the modulation type.

An overcoding based on a time unit corresponding to the duration of a symbol (or type-A bit) divided by four, and thus to pulse I is defined. It is then provided to interpret this overcoding of four bits per symbol to discriminate the different modulation types. In other words, a symbol is divided into four elements and a state 0 or 1 is assigned to each symbol quarter according to its (relative) low or high level. In practice, this decoding is performed by a type-A demodulator to determine the position of pulse I (FIG. 3), and thus the value of a received bit. It is thus sufficient to interpret differently the value of a type-A demodulated symbol.

Figure 4:
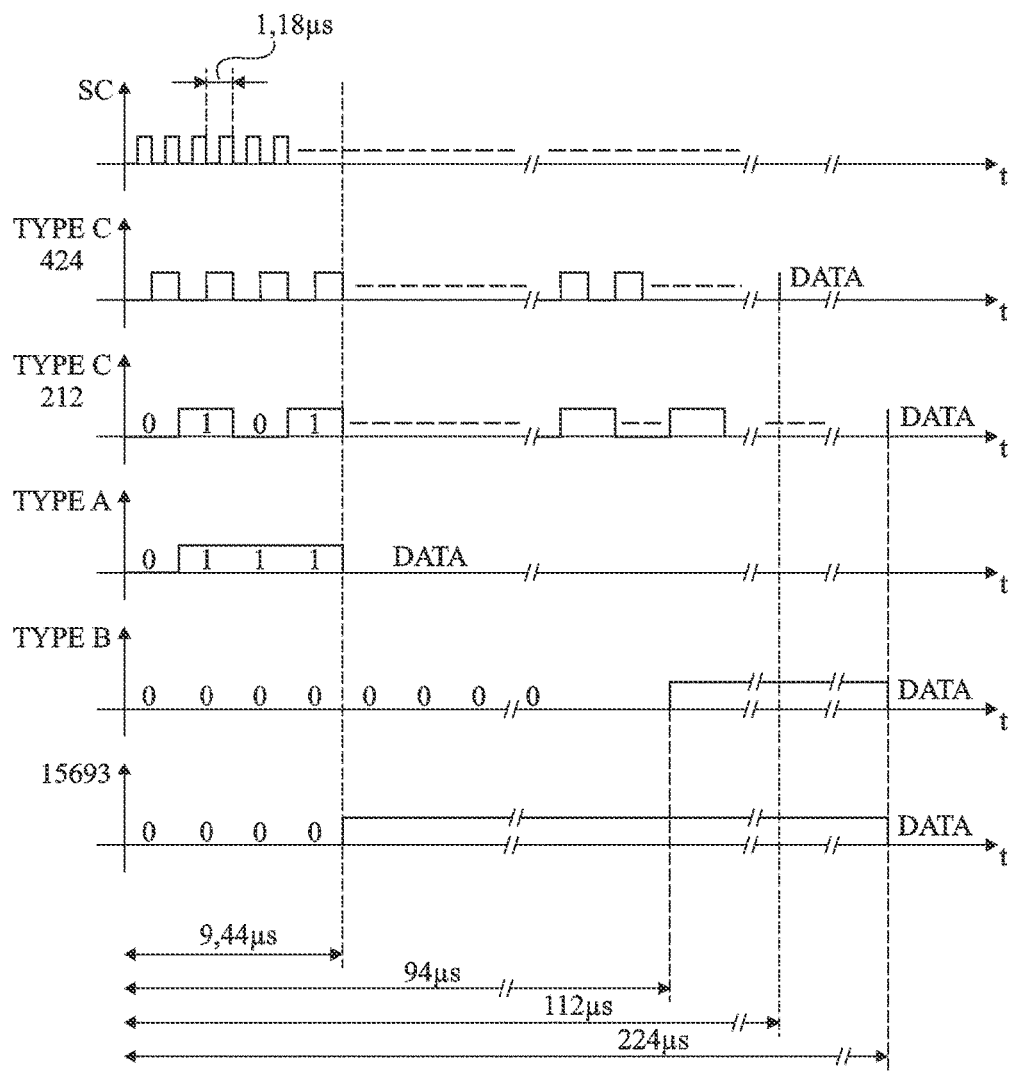
FIG. 4 shows timing diagrams illustrating initial phases of communication according to different communication types capable of being used by an NFC router operating in card mode.

FIG. 4 shows timing diagrams according to different modulation types to illustrate the selection mode performed in relation with FIG. 2. The first timing diagram illustrates the shape of carrier SC approximately at 848 kHz (period of approximately 1.18 μs). The following timing diagrams illustrate the respective shapes of the symbols present at a start of frame, respectively according to the following types:
- C-424 (type C at 424 kbits/s): symbol not recognized;
- C-212 (type C at 212 kbits/s): alternation of pulses representing pulses I;
- A: symbol representing a bit at state 0 in type A (FIG. 3);
- B: 5 symbols at 0 followed by a symbol at 1;
- 15693: 1 half-symbol in the low state followed by several half-symbols in the high state (4 in 15693-(100 or 10)-4 and 6 in 15693-(100 or 10)-256).

The type-A modulation is that where the start of frame (SOF) is the shortest, data DATA being transmitted after a single symbol at 0 according to type A, that is a symbol having value 0111 according to the overcoding of four bits per symbol.

The frames, which may be of initialization frame type, illustrated in FIG. 4, are transmitted during relatively long time periods to leave time for a transponder to detect the frame. For example:
- a type-B frame represents 94 microseconds;
- a type-C-424 frame represents 112 microseconds;
- a type-C-212 frame represents 224 microseconds; and
- a frame 15693 represents approximately 75 microseconds.

Waiting each time for a full frame in order for the terminal to consider a lack of compatibility with the transponder before switching to another type of modulation takes time.

Further, applications in which near-field communications are used generally are applications where a user brings his device close to the terminal and where transactions should be performed rapidly.

An embodiment uses one or two 9.44 μs durations representing the transmission time of a type-A symbol, to determine the modulation type used by the terminal during the sending of its start of frame.

Figure 5:
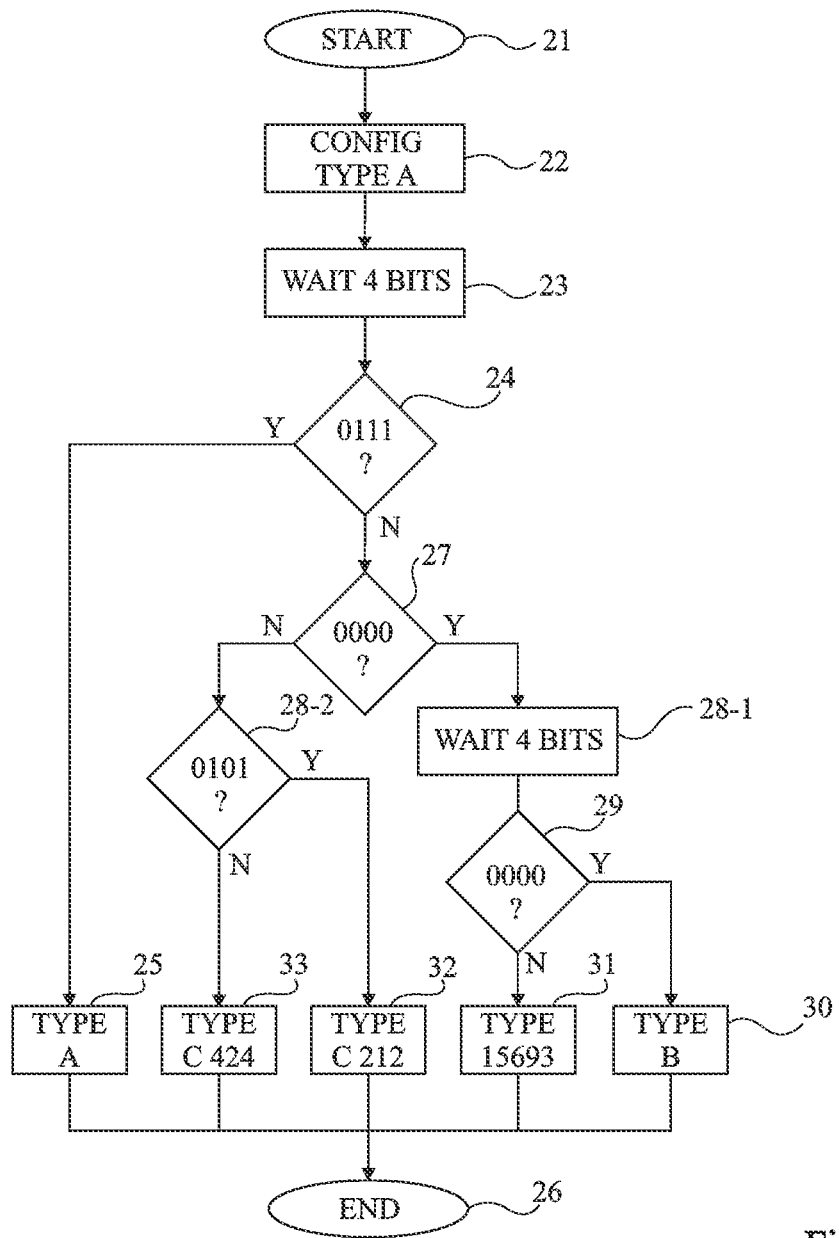
FIG. 5 is a simplified flowchart of an NFC router configuration mode.

FIG. 5 is a simplified flowchart of a selection mode implemented by selector 16 of FIG. 2 to determine the type of modulation transmitted by a terminal.

At the starting of the system (block 21, START), radio frequency front end 12 is woken up by the receiving of a signal from a terminal and selector 16 initially configures decoder 14 to be able to decode a type-A modulation (block 22, CONFIG TYPE A). The no-load configuration of decoder 14 thus is type A.

Decoder 14 demodulates and decodes the received signal as if it was a type-A modulation and sends the received bits to selector 16. The received bits are sent in parallel to the rest of the transponder circuit but are not exploited for the time being. In particular, as long as selector 16 has not validated the modulation type by a signal intended for these circuits (a validation bit OK intended for the device microcontroller), signal Rx is not used.

The selector waits (block 23, WAIT 4 BITS) for the reception of four overcoded bits (or of a type-A symbol). This amounts to decoding, in type A, a 9.44-μs time slot, independently from the received signal and from the coding performed by the modulation type.

Once these four bits have been received and decoded, selector 16 determines whether these bits correspond to a symbol of value 0111 (block 24, 0111?). This amounts to detecting the presence of a start-of-frame symbol on a type-A modulation.

If the answer is positive (output Y of block 24), this means that the terminal is configured for the type-A modulation. Selector 16 validates the configuration type of decoder 14 (block 25, TYPE A) and the configuration process is ended (block 26, END).

If the answer is no (output N of block 24), selector 16 determines whether the received symbol has value 0000 (block 27, 0000?). Such a symbol has no meaning in a type-A modulation. However, it enables to determine whether the modulation is of type C or of type B or 15693.

If the symbol is 0000 (output Y of block 27), this means (see FIG. 4) either a type-B configuration or a type-15693 start of frame. The equivalent of a next symbol in type A (block 28-1, WAIT 4 BITS), and thus a second time slot of approximately 9.44 μs, should then be decoded.

Once this symbol has been received, selector 16 interprets it by quarters and compares the received symbol with value 0000 (block 29, 0000?). If the symbol is 0000, this means a type-B modulation (block 30, TYPE B). Selector 16 then modifies the configuration of decoder 14 so that it is configured on type B and the configuration is ended (block 26). Two periods of 9.44 microseconds are thus sufficient to identify type B.

If the result is negative (output N of block 29), this means a type 15693 and selector 16 appropriately configures the decoder (block 31, TYPE 15693) and the configuration is ended (block 26). Here again, in two periods of 9.44 microseconds, it has been possible to properly configure the receiver.

If the interpretation of the first type-A symbol is neither 0111 nor 0000 (output N of block 27), its value is compared with 0101 (block 28-2 0101?). Such a symbol here again has no meaning in a type-A modulation. However, it enables to determine whether the modulation is of type C at 212 kbits (see the timing diagram of FIG. 4). Accordingly, if the symbol is 0101, the selector configures the decoder in type C 212 (block 32, TYPE C 212). If it is not, this means that the modulation is of type C 424 (block 33, TYPE C 424).

The foregoing description shows that by interpreting at most two consecutive time slots having a duration corresponding to that of a symbol of the initialization frames (also corresponding to the duration of a symbol in the type-A modulation), one can configure the receiver by interpreting the symbol as if it was overcoded on 4 bits.

It is thus no longer necessary to wait for the end of a frame, nor for a switching of the terminal to another modulation type. As soon as it is properly configured according to the method of FIG. 5, the device in card mode responds to the terminal by using the right type of retromodulation, which is a function of the modulation type.

This method may be used either to configure a device in near field while a terminal only transmits according to a modulation type, or to match the modulation of this near-field device with respect to a terminal scanning the different modulation types. In both cases, the devices are then capable of communicating together.

Once the type has been identified by the selector, the mobile telecommunication device is configured to send an acknowledgement message to the terminal. Receiving this response, the terminal knows that the transponder is capable of interpreting the modulation that it transmits.

In a simplified embodiment, the above-described method only detects some of the modulation types.

For example, for a device only operating according to types A and C, only tests 24, 27, and 28-2 will be performed and, in case of a positive outcome of test 27, the device does not respond and waits for the terminal to switch to another modulation type.

According to another example, the device is only capable of operating in type A, in type B, or in type 15693. In this case, in the occurrence of a failure of test 27, it is waited for the terminal to change modulation type.

Further, the order of tests 24, 27, and 28-2 may be modified. The discussion of FIG. 5 however is an embodiment which facilitates more rapidly identifying type A.

Various embodiments have been described. Various alterations and modifications will readily occur to those skilled in the art. In particular, the selection of the types detected by the implementation of these embodiments depends on the concerned mobile telecommunication device, provided for it to be capable of decoding at least one type-A modulation.

Further, the practical implementation of the described embodiments is within the abilities of those skilled in the art based on the functional indications given hereabove. In particular, the interpretation of the transmitted symbols may be performed by the digital processing circuits usually present in a device comprising an NFC router. It will however be ascertained to parameterize the receive front end and the decoder on an interpretation of a signal duration approximately corresponding to 9.44 microseconds.

Such alterations, modifications, and improvements are intended to be part of this disclosure. Accordingly, the foregoing description is by way of example only and is not intended to be limiting.

What is claimed is:

1. A device, comprising:
   demodulation and decoding circuitry, which in operation, decodes received signals according to a selected modulation type of a plurality of modulation types; and
   modulation-type selection circuitry, coupled to the demodulation and decoding circuitry, wherein the modulation-type selection circuitry, in operation, determines a modulation type of a received signal, the determining the modulation type of the received signal including:
      controlling the demodulation and decoding circuitry to decode the received signal as a type-A modulated signal for a first time slot corresponding to a duration of a type-A symbol;
      when a result of the decoding of the first time slot as a type-A modulated signal is 0111, selecting type-A modulation as the modulation type of the received signal; and
      when the result of the decoding of the first time slot as a type-A modulated signal is 0101, selecting type-C modulation at 212 kbits per second as the modulation type of the received signal.

2. The device of claim 1 wherein when the result of decoding the first time slot as a type-A modulated signal is 0000, the modulation-type selection circuitry controls the demodulation and decoding circuitry to decode the received signal as a type-A modulated signal for a second time slot corresponding to the duration and selects the modulation type of the received signal based on the result of the decoding of the second time slot as a type-A modulated signal.

3. The device of claim 2 wherein:
   when the result of the decoding of the second time slot as a type-A modulated signal is 0000, the modulation-type selection circuitry selects type-B modulation as the modulation type of the received signal; and
   when the result of the decoding of the second time slot as a type-A modulated signal is not 0000, the modulation-type selection circuitry selects type-15693 modulation as the modulation type of the received signal.

4. The device of claim 1 wherein when the result of the decoding of the first time slot as a type-A modulated signal is not included in a set of results {0000, 0111, 0101}, the modulation-type selection circuitry selects type-C modulation at 424 kbits per second as the modulation type of the received signal.

5. The device of claim 1 wherein when the result of the decoding of the first time slot as a type-A modulated signal is not included in a set of results {0111, 0101}, the modulation-type selection circuitry selects type-C modulation at 424 kbits per second as the modulation type of the received signal.

6. The device of claim 1 wherein the modulation-type selection circuitry enables an output of the demodulation and decoding circuitry after selecting the modulation type of the received signal.

7. A system, comprising:
   analog-front-end circuitry; and
   digital-signal-processing circuitry coupled to the analog-front-end circuitry, wherein the digital-signal-processing circuitry, in operation,
      determines a modulation type of a received signal, the determining the modulation type of the received signal including:
         decoding the received signal as a type-A modulated signal for a first time slot corresponding to a duration of a type-A symbol;
         when a result of the decoding of the first time slot as a type-A modulated signal is 0111, selecting type-A modulation as the modulation type of the received signal; and
         when the result of the decoding of the first time slot as a type-A modulated signal is 0101, selecting type-C modulation at 212 kbits per second as the modulation type of the received signal; and
      decoding the received signal using the selected modulation type of the received signal.

8. The system of claim 7 wherein when the result of decoding the first time slot as a type-A modulated signal is 0000, the digital-signal-processing circuitry decodes the received signal as a type-A modulated signal for a second time slot corresponding to the duration and selects the modulation type of the received signal based on the result of the decoding of the second time slot as a type-A modulated signal.

9. The system of claim 8 wherein:
   when the result of the decoding of the second time slot as a type-A modulated signal is 0000, the digital-signal-processing circuitry selects type-B modulation as the modulation type of the received signal; and when the result of the decoding of the second time slot as a type-A modulated signal is not 0000, the digital-signal-processing circuitry selects type-15693 modulation as the modulation type of the received signal.

10. The system of claim 7 wherein when the result of the decoding of the first time slot as a type-A modulated signal is not included in a set of results {0000, 0111, 0101}, the digital-signal-processing circuitry selects type-C modulation at 424 kbits per second as the modulation type of the received signal.

11. The system of claim 7 wherein when the result of the decoding of the first time slot as a type-A modulated signal is not included in a set of results {0111, 0101}, the digital-signal-processing circuitry selects type-C modulation at 424 kbits per second as the modulation type of the received signal.

12. The system of claim 7 wherein the digital-signal-processing circuitry enables a decoded signal output after selecting the modulation type of the received signal.

13. The system of claim 7, comprising a near-field communication router including the analog-front-end circuitry and the digital-signal-processing circuitry, wherein the analog front end, in operation, receives and transmits radio frequency signals.

14. A non-transitory computer-readable medium whose contents configure a near-field communication router to perform a method, the method comprising:
determining a modulation type of a received signal, the determining the modulation type including:
decoding the received signal as a type-A modulated signal for a first time slot corresponding to a duration of a type-A symbol;
when a result of the decoding of the first time slot as a type-A modulated signal is 0111, selecting type-A modulation as the modulation type of the received signal; and
when the result of the decoding of the first time slot as a type-A modulated signal is 0101, selecting type-C modulation at 212 kbits per second as the modulation type of the received signal; and
decoding the received signal using the selected modulation type of the received signal.

15. The medium of claim 14 wherein when the result of decoding the first time slot as a type-A modulated signal is 0000, the method comprises decoding the received signal as a type-A modulated signal for a second time slot corresponding to the duration and selecting the modulation type of the received signal based on the result of the decoding of the second time slot as a type-A modulated signal.

16. The medium of claim 15 wherein the method comprises:
when the result of the decoding of the second time slot as a type-A modulated signal is 0000, selecting type-B modulation as the modulation type of the received signal; and
when the result of the decoding of the second time slot as a type-A modulated signal is not 0000, selecting type-15693 modulation as the modulation type of the received signal.

17. The medium of claim 14 wherein the method comprises:
when the result of the decoding of the first time slot as a type-A modulated signal is not included in a set of results {0000, 0111, 0101}, selecting type-C modulation at 424 kbits per second as the modulation type of the received signal.

18. The medium of claim 14 wherein the method comprises:
enabling a decoded signal output after selecting the modulation type of the received signal.

19. A method, comprising:
determining a modulation type of a received signal using near-field communication routing circuitry, the determining the modulation type including:
decoding, using the near-field communication routing circuitry, the received signal as a type-A modulated signal for a first time slot corresponding to a duration of a type-A symbol;
responding to a result of 0111 of the decoding of the first time slot as a type-A modulated signal, by selecting, by the near-field communication routing circuitry, type-A modulation as the modulation type of the received signal; and
responding to a result of 0101 of the decoding of the first time slot as a type-A modulated signal, by selecting, by the near-field communication routing circuitry, type-C modulation at 212 kbits per second as the modulation type of the received signal; and
decoding, by the near-field communication routing circuitry, the received signal using the selected modulation type of the received signal.

20. The method of claim 19, comprising:
when the result of decoding the first time slot as a type-A modulated signal is 0000, decoding, by the near-field communication routing circuitry, the received signal as a type-A modulated signal for a second time slot corresponding to the duration and selecting, by the near-field communication routing circuitry, the modulation type of the received signal based on the result of the decoding of the second time slot as a type-A modulated signal.

21. The method of claim 20, comprising:
when the result of the decoding of the second time slot as a type-A modulated signal is 0000, selecting type-B modulation as the modulation type of the received signal; and
when the result of the decoding of the second time slot as a type-A modulated signal is not 0000, selecting type-15693 modulation as the modulation type of the received signal.

22. The method of claim 19, comprising:
when the result of the decoding of the first time slot as a type-A modulated signal is not included in a set of results {0000, 0111, 0101}, selecting, by the near-field communication routing circuitry, type-C modulation at 424 kbits per second as the modulation type of the received signal.

23. The method of claim 19, comprising:
enabling, by the near-field communication routing circuitry, a decoded signal output after selecting the modulation type of the received signal.

* * * * *